(12) United States Patent
Shin et al.

(10) Patent No.: US 12,202,206 B2
(45) Date of Patent: Jan. 21, 2025

(54) 3D PRINTING SLICING METHOD FOR SOLVING TOLERANCE PROBLEM

(71) Applicant: Korea Electronics Technology Institute, Seongnam-si (KR)

(72) Inventors: Hwa Seon Shin, Yongin-si (KR); Hye In Lee, Anyang-si (KR); Sung Hwan Chun, Seoul (KR); Sung Hun Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 392 days.

(21) Appl. No.: 17/623,112

(22) PCT Filed: Nov. 3, 2021

(86) PCT No.: PCT/KR2021/015748
§ 371 (c)(1),
(2) Date: Dec. 27, 2021

(87) PCT Pub. No.: WO2022/114566
PCT Pub. Date: Jun. 2, 2022

(65) Prior Publication Data
US 2023/0256677 A1    Aug. 17, 2023

(30) Foreign Application Priority Data
Nov. 25, 2020    (KR) .................. 10-2020-0159482

(51) Int. Cl.
*B29C 64/393*    (2017.01)
*B33Y 50/02*    (2015.01)
*G06T 19/20*    (2011.01)

(52) U.S. Cl.
CPC ............ *B29C 64/393* (2017.08); *B33Y 50/02* (2014.12); *G06T 19/20* (2013.01); *G06T 2219/008* (2013.01)

(58) Field of Classification Search
CPC ..... B29C 64/386; B29C 64/393; G06T 19/20; G06T 2219/008; B33Y 50/00; B33Y 50/02
See application file for complete search history.

(56) References Cited

U.S. PATENT DOCUMENTS

2015/0148930 A1* 5/2015 Kumar ............... G06T 19/20
                                                    700/98
2016/0221262 A1* 8/2016 Das .................. B22C 9/24
(Continued)

FOREIGN PATENT DOCUMENTS

KR    10-0229580 B1    11/1999

OTHER PUBLICATIONS

Korean Office Action issued on Jul. 26, 2021 in counterpart Korean Patent Application No. 10-2020-0159482 (3 pages in English, 5 pages in Korean).

*Primary Examiner* — Nicholas Klicos
(74) *Attorney, Agent, or Firm* — NSIP Law

(57) ABSTRACT

Provided are a method and a system for solving a tolerance problem which may occur in a slicing quantization (staircase effect) process of 3D printing which slices a 3D model and laminates layers one by one. According to an embodiment of the present disclosure, a 3D model slicing method includes the steps of: receiving, by a 3D model slicing system, an input of data of a 3D model to 3D print; examining, by the 3D model slicing system, a dimension of a layer thickness of the inputted 3D model; correcting, by the 3D model slicing system, a size of a layer for slicing, based on a result of the examining; and slicing, by the 3D model slicing system, the corrected 3D model. Accordingly, by preserving a dimension within a layer thickness, a problem that a concavo-convex portion is lost in a slicing quantization (Continued)

process of 3D printing according to a slicing position within a layer thickness, and a tolerance occurs is solved.

20 Claims, 6 Drawing Sheets

(56) References Cited

U.S. PATENT DOCUMENTS

| | | | |
|---|---|---|---|
| 2017/0203515 A1* | 7/2017 | Bennett | B29C 64/393 |
| 2017/0232515 A1* | 8/2017 | DeMuth | B22F 12/90 |
| | | | 419/53 |
| 2017/0282608 A1* | 10/2017 | Valade | B33Y 10/00 |
| 2017/0291427 A1* | 10/2017 | Kubo | G06K 15/021 |
| 2018/0133956 A1* | 5/2018 | Buller | B33Y 50/02 |
| 2019/0255771 A1* | 8/2019 | Ilies | B29C 64/236 |
| 2019/0308369 A1* | 10/2019 | Shiraishi | B29C 64/153 |

* cited by examiner $L_t$ : Layer Thickness

Quantization error

Input model

3D PRINTING SLICING METHOD FOR SOLVING TOLERANCE PROBLEM

CROSS REFERENCE TO RELATED APPLICATIONS

This application is a U.S. National Stage Application of International Application No. PCT/KR2021/015748, filed on Nov. 3, 2021, which claims the benefit under 35 USC 119(a) and 365(b) of Korean Patent Application No. 10-2020-0159482 filed on Nov. 25, 2020, in the Korean Intellectual Property Office, the entire disclosure of which is incorporated herein by reference for all purposes.

TECHNICAL FIELD

The present disclosure relates to 3D printing technology, and more particularly, to a method and a system for solving a tolerance problem which occurs in a slicing quantization (staircase effect) process of 3D printing, which slices a 3D model and laminates layers one by one.

BACKGROUND ART

Since 3D printing uses additive manufacturing, it may accompany a process of slicing by a layer thickness.

In this case, as shown in FIG. 1, a different slicing position may be set within the layer thickness. That is, the slicing position may be set with reference to a bottom surface (left) or a top surface (center), or may be set with reference to a certain position (right) within the layer thickness.

According to a related-art method, once a slicing position is designated, all layers are fixed to the specific slicing position and the slicing position is uniformly used. Accordingly, if there is a concavo-convex portion within the layer thickness as shown in FIG. 2, a quantization error may occur according to a slicing position even within the layer thickness as shown in FIG. 3.

This is because the concavo-convex portion existing within the layer thickness may be lost according to a slicing position.

To this end, the related-art technology may have a problem of a dimensional error (tolerance) from an original model to manufacture.

The problem of the dimensional error in the 3D printing may be more serious when precise manufacturing requiring dimensional accuracy is performed, and accordingly, there is a demand for a method for solving the dimensional error problem.

DISCLOSURE

Technical Problem

The present disclosure has been developed in order to address the above-discussed deficiencies of the prior art, and an object of the present disclosure is to provide a method and a system for solving a tolerance problem which may occur in a slicing quantization process (staircase effect) of 3D printing, by preserving a dimension within a layer thickness.

Technical Solution

According to an embodiment of the present disclosure to achieve the above-described object, a 3D model slicing method includes the steps of: receiving, by a 3D model slicing system, an input of data of a 3D model to 3D print; examining, by the 3D model slicing system, a dimension of a layer thickness of the inputted 3D model; correcting, by the 3D model slicing system, a size of a layer for slicing, based on a result of the examining; and slicing, by the 3D model slicing system, the corrected 3D model.

In addition, the step of correcting may include correcting the size of the layer for slicing, based on a width within the layer thickness of the 3D model.

In addition, the step of correcting may include determining a compensation area for correcting the size of the layer for slicing, based on the width within the layer thickness of the 3D model, and the step of slicing may include slicing the 3D model by reflecting the determined compensation area.

In addition, the step of correcting may include, when there exists a concavo-convex portion within the layer thickness of the 3D model, individually determining compensation areas based on different widths.

In addition, the step of correcting may include determining a compensation area based on a largest width of widths within the layer thickness of the 3D model in order to preserve an overall dimension of the 3D model.

In addition, the step of correcting may include correcting the size of the layer for slicing, based on a smallest width of widths in the layer thickness of the 3D model in order to preserve a minimum width of the 3D model in priority.

In addition, the step of correcting may include, when there exists a concavo-convex portion within the layer thickness of the 3D model and it is determined whether to preserve an overall dimension of the 3D model or whether to preserve a minimum width in priority, correcting the size of the layer for slicing based on a largest width or a smallest width of widths in each layer thickness according to a result of the determining.

In addition, the step of receiving the input may include receiving an input of data of a 3D model to which data setting information for determining whether to preserve an overall dimension of the 3D model or whether to preserve a minimum width in priority is added.

According to an embodiment of the present disclosure, the 3D model slicing method may further include a step of 3D printing, by the 3D model slicing system, the 3D model by laminating the sliced 3D model.

According to another embodiment of the present disclosure, a 3D model slicing system includes: an input unit configured to receive an input of data of a 3D model to 3D print; and a processor configured to examine a dimension of a layer thickness of the inputted 3D model, to correct a size of a layer for slicing, based on a result of the examining, and to slice the corrected 3D model.

According to still another embodiment of the present disclosure, a 3D model slicing method includes the steps of: examining, by a 3D model slicing system, a dimension of a layer thickness of an inputted 3D model; correcting, by the 3D model slicing system, a size of a layer for slicing, based on a result of the examining; and slicing, by the 3D model slicing system, the corrected 3D model.

According to yet another embodiment of the present disclosure, a computer-readable recording medium has a computer program recorded thereon to execute a 3D model slicing method, the method comprising the steps of: examining, by a 3D model slicing system, a dimension of a layer thickness of an inputted 3D model; correcting, by the 3D model slicing system, a size of a layer for slicing, based on a result of the examining; and slicing, by the 3D model slicing system, the corrected 3D model.

Advantageous Effects

According to embodiments of the present disclosure as described above, by preserving a dimension within a layer thickness, a problem that a concavo-convex portion is lost in a slicing quantization process of 3D printing according to a slicing position within a layer thickness, and a tolerance occurs is solved.

BEST MODE

Hereinafter, the present disclosure will be described in more detail with reference to the drawings.

Figure 1:
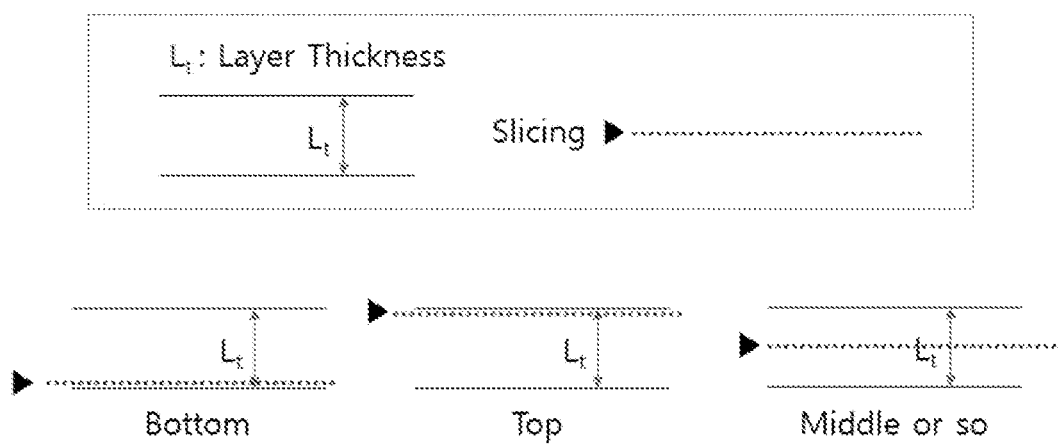
FIG. 1 is a view illustrating examples of different slicing positions set within a layer thickness at a 3D printing slicing step.
Figure 2:
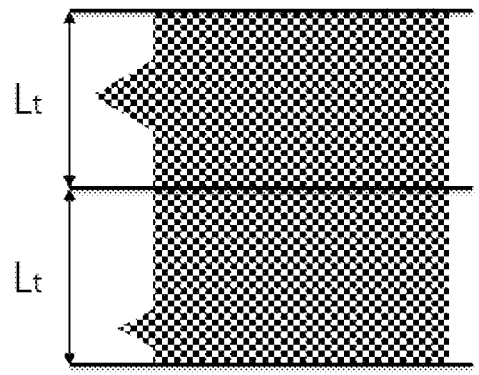
FIGS. 2 and 3 are views provided to explain a dimensional error which may occur in a 3D printing slicing process.
Figure 3:
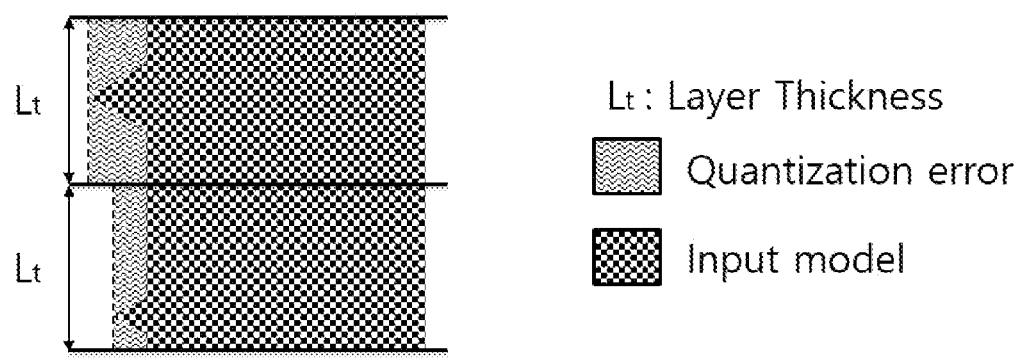
Figure 4:
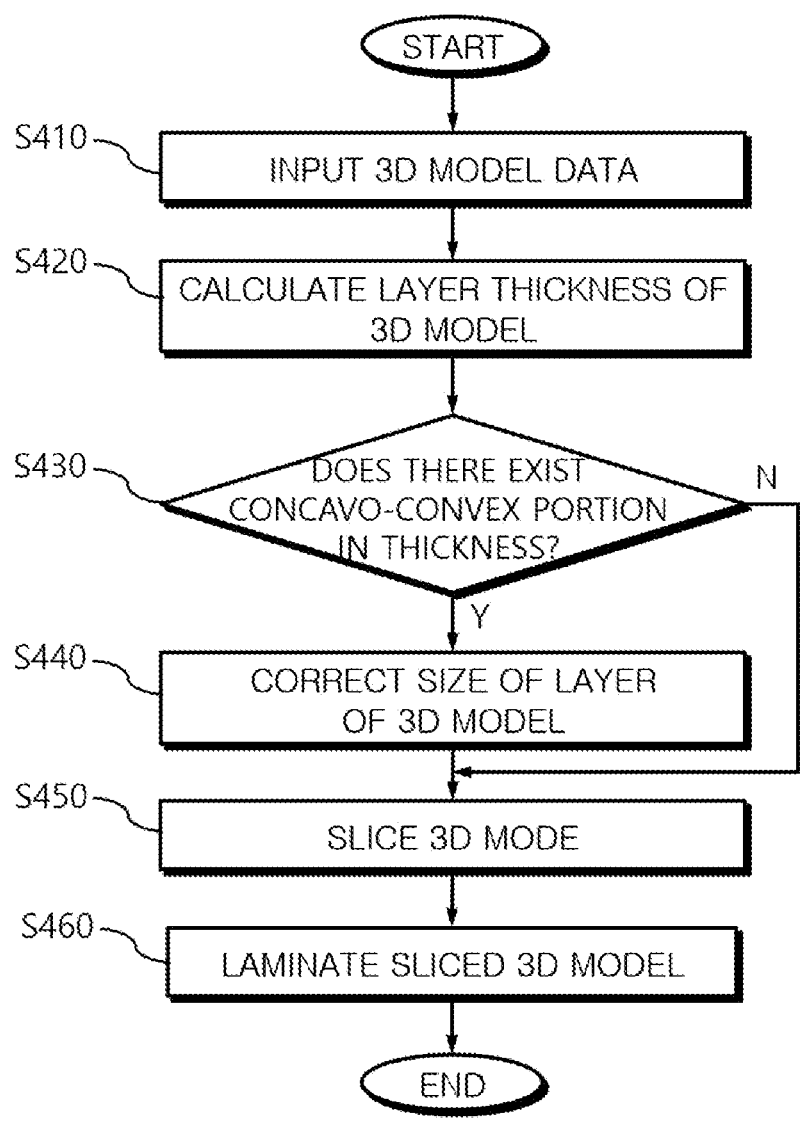
FIG. 4 is a flowchart provided to explain a 3D printing slicing method according to an embodiment of the present disclosure.

FIG. 4 is a flowchart provided to explain a 3D printing slicing method according to an embodiment of the present disclosure.

The 3D printing slicing method according to the present embodiment is provided to solve a tolerance problem which may occur in a slicing quantization (staircase effect) process of 3D printing, by preserving a dimension within a layer thickness.

To achieve this, the 3D printing slicing method may preserve a dimension within a layer thickness, by examining a dimension of a layer thickness of a 3D model, correcting the size of a layer for slicing, based on a result of examination, and then, slicing the corrected 3D model.

Specifically, the 3D printing slicing method may receive an input of data of a 3D model to 3D print by using a 3D model slicing system (S410), and may examine a dimension of a layer thickness of the inputted 3D model (S420).

When there exists a concavo-convex portion within the layer thickness of the inputted 3D model (S430-Y), the method may correct the size of a layer for slicing, based on a result of examination (S440).

Specifically, when there exists a concavo-convex portion within the layer thickness of the inputted 3D model, the method may correct the size of the layer for slicing, based on a width within the layer thickness of the 3D model, when correcting the size of the layer.

In this case, when there exists the concavo-convex portion within the layer thickness of the inputted 3D model, the 3D model slicing system may determine whether to preserve the overall dimension of the 3D model or whether to preserve a minimum width in priority, based on data setting information added to the data of the inputted 3D model, and may correct the size of the layer for slicing according to a result of determination.

When the size of the layer for slicing is corrected, the corrected 3D model may be sliced by using the 3D model slicing system (S450), and the 3D model may be 3D printed by laminating the sliced 3D model (S460).

Figure 5:
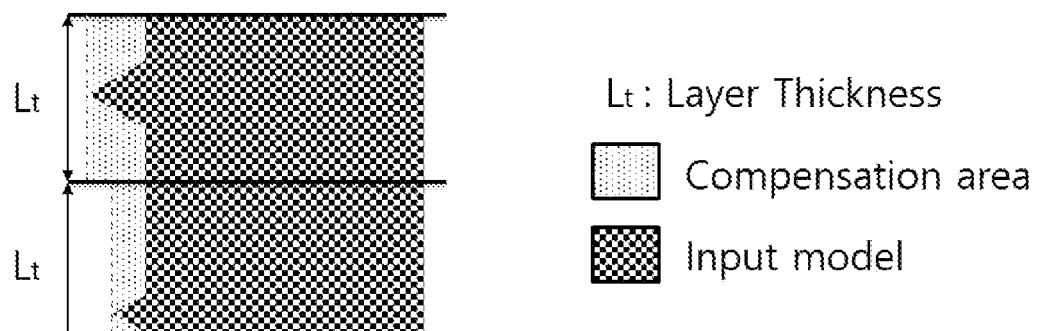
FIGS. 5 and 6 are views provided to explain a process of preserving an overall dimension of a 3D model by reflecting a compensation area according to an embodiment of the present disclosure.
Figure 6:
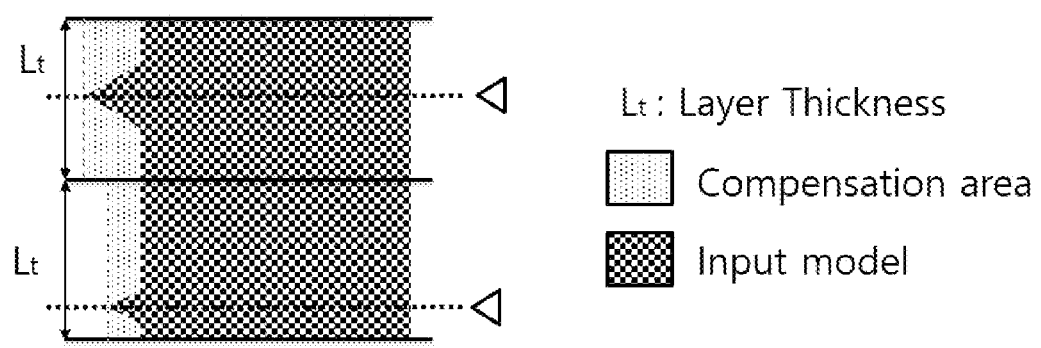

FIGS. 5 and 6 are views provided to explain a process of preserving an overall dimension of a 3D model by reflecting a compensation area according to an embodiment of the present disclosure.

In the present embodiment, a process of preserving an overall dimension of a 3D model by reflecting a compensation area when there exists a concavo-convex portion within a layer thickness of the 3D model as shown in FIG. 5 will be described.

The 3D model slicing system according to the present embodiment may correct a size of a layer for slicing, based on a width within a layer thickness of a 3D model, when correcting the size of the layer for slicing.

Specifically, the 3D model slicing system may determine a compensation area for correcting the size of the layer for slicing, based on the width within the layer thickness, when correcting the size of the layer for slicing, and may slice the 3D model by reflecting the determined compensation area in the process of slicing into layers, so that the overall dimension of the 3D model is preserved.

Herein, preserving the overall dimension may refer to preserving all dimensions of the layers without a lost dimension.

For example, the 3D model slicing system may determine a compensation area, based on a largest width among widths in the layer thickness of the 3D model when correcting the size of the layer for slicing, and may slice the 3D model by reflecting the determined compensation area in the process of slicing into layers.

In addition, when widths are different in layer thicknesses as shown in FIGS. 5 and 6, the 3D model slicing system may individually determine compensation areas based on the different widths when correcting the size of the layer for slicing.

Through this, a dimension which may be lost in related-art technology may be compensated for, so that a tolerance problem is solved.

Figure 7:
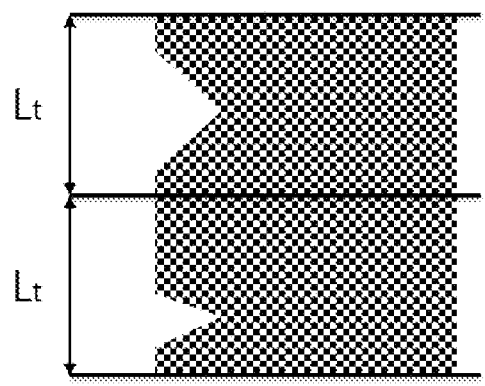
FIGS. 7 to 9 are views provided to explain a process of preserving a minimum width of a 3D model in priority, by correcting a layer size of the 3D model according to an embodiment of the present disclosure.
Figure 8:
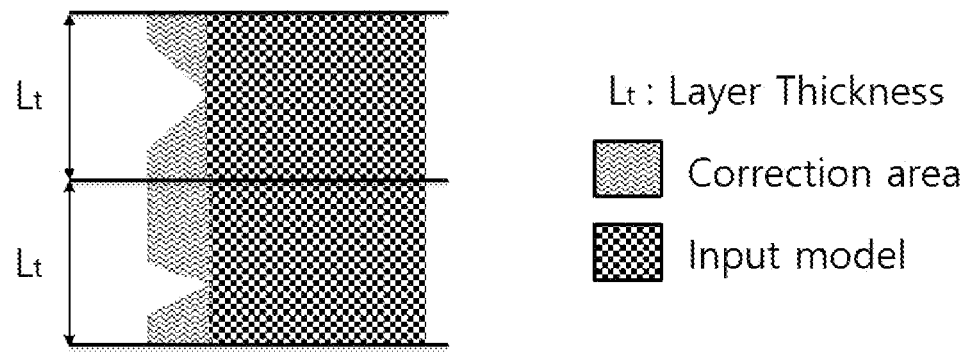
Figure 9:
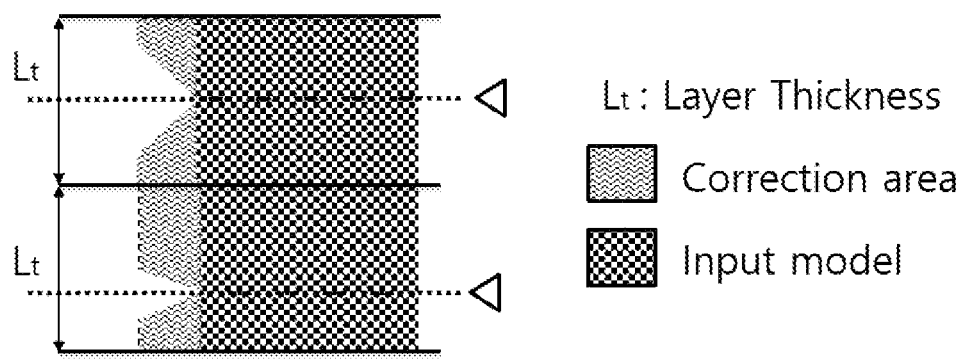

FIGS. 7 to 9 are views provided to explain a process of preserving a minimum width of a 3D model in priority, by correcting a layer size of the 3D model according to an embodiment of the present disclosure.

Referring to FIGS. 7 to 9, when there exists a concavo-convex portion within a layer thickness of a 3D model in a shape shown in FIG. 7, and it is determined that a minimum width of the 3D model is preserved in priority, the 3D model slicing system may correct a layer size of the 3D model in order to preserve the minimum width of the 3D model in priority.

That is, the 3D model slicing system may correct the size of the layer for slicing, based on a smallest width of widths within the layer thickness of the 3D model, as shown in FIG. 9, in order to preserve the minimum width of the 3D model in priority.

This may be applied when 3D printing is performed for a 3D model which is targeted on a product that puts more importance on a minimum width than the other widths like an injection needle.

In addition, when it is determined that the minimum width of the 3D model is preserved in priority and the widths within the layer thicknesses of the 3D model are different, the 3D model slicing system may correct the sizes of the respective layer thicknesses based on the different minimum widths.

Figure 10:
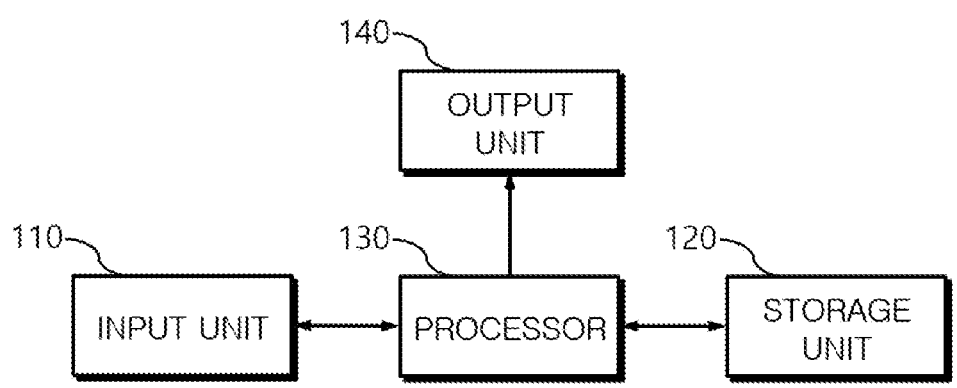
FIG. 10 is a view provided to explain a 3D model slicing system according to an embodiment of the present disclosure.

FIG. 10 is a view provided to explain a 3D model slicing system according to an embodiment of the present disclosure.

The 3D model slicing system according to the present embodiment may include an input unit 110, a storage unit 120, a processor 130, and a storage unit 140 as shown in FIG. 10.

The input unit 110 may be provided with a communication module to receive an input of a 3D model to 3D print from the outside, or to transmit data of a 3D model to 3D printing, and may receive an input of settings/command necessary for 3D model slicing/printing.

The storage unit 120 may be a storage medium for storing a program and data necessary for operating the processor 130, and the output unit 140 may be a display that displays a screen related to 3D model slicing/printing.

The processor 130 is provided to process overall matters of the 3D model slicing system Specifically, the processor 130 may 3D print a 3D model by examining a dimension of a layer thickness of the inputted 3D model, correcting a size of a layer for slicing, based on a result of examination, slicing the corrected 3D model, and laminating the sliced 3D model.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A 3D model slicing method comprising:
   receiving, by a 3D model slicing system, an input of data of a 3D model to 3D print;
   examining, by the 3D model slicing system, a dimension of a layer thickness of the inputted 3D model;
   determining whether a concavo-convex portion is detected within a layer of the inputted 3D model;
   determining whether to preserve an overall dimension of the 3D model or to preserve a minimum width of the 3D model in priority;
   based on the determining that the concavo-convex portion is detected within the layer of the inputted 3D model and based on the determining whether to preserve the overall dimension of the 3D model or to preserve the minimum width of the 3D model in priority, determining a compensation area corresponding to the concavo-convex portion and adding the compensation area to the layer of the inputted 3D model for slicing;
   correcting, by the 3D model slicing system, a size of the layer for slicing, based on a result of the examining and a result of the determining the compensation area and the adding; and
   slicing, by the 3D model slicing system, the corrected 3D model.

2. The method of claim 1, wherein the correcting comprises correcting the size of the layer for slicing, based on a width within the layer thickness of the 3D model.

3. The method of claim 2, wherein the correcting comprises determining a compensation area for correcting the size of the layer for slicing, based on the width within the layer thickness of the 3D model, and
   wherein the slicing comprises slicing the 3D model by reflecting the determined compensation area.

4. The method of claim 3, wherein the correcting comprises, when there exists the concavo-convex portion within the layer thickness of the 3D model, individually determining compensation areas based on different widths.

5. The method of claim 3, wherein the correcting comprises determining a compensation area based on a largest width of widths within the layer thickness of the 3D model in order to preserve the overall dimension of the 3D model.

6. The method of claim 5, wherein the correcting comprises, when there exists the concavo-convex portion within the layer thickness of the 3D model and it is determined whether to preserve the overall dimension of the 3D model or whether to preserve a minimum width in priority, correcting the size of the layer for slicing based on a largest width or a smallest width of widths in each layer thickness according to a result of the determining.

7. The method of claim 6, wherein the receiving the input comprises receiving an input of data of a 3D model to which data setting information for determining whether to preserve the overall dimension of the 3D model or whether to preserve a minimum width in priority is added.

8. The method of claim 3, wherein the correcting comprises correcting the size of the layer for slicing, based on a smallest width of widths in the layer thickness of the 3D model in order to preserve the minimum width of the 3D model in priority.

9. The method of claim 8, further comprises, when there exists a concavo-convex portion within the layer thickness of the 3D model and it is determined whether to preserve the overall dimension of the 3D model or whether to preserve the minimum width in priority, correcting the size of the layer for slicing based on a largest width or a smallest width of widths in each layer thickness according to a result of the determining.

10. The method of claim 9, further comprises receiving an input of data of a 3D model to which data setting information for determining whether to preserve the overall dimension of the 3D model or whether to preserve a minimum width in priority is added.

11. The method of claim 1, further comprising performing 3D printing, by the 3D model slicing system, the 3D model by laminating the sliced 3D model.

12. A 3D model slicing system comprising:
   one or more processors configured to:
   receive an input of data of a 3D model to 3D print;
   examine a dimension of a layer thickness of the inputted 3D model;
   determine whether a concavo-convex portion is detected within a layer of the inputted 3D model;
   determine whether to preserve an overall dimension of the 3D model or to preserve a minimum width of the 3D model in priority;

based on the determining that the concavo-convex portion is detected within the layer of the inputted 3D model and based on the determining whether to preserve the overall dimension of the 3D model or to preserve the minimum width of the 3D model in priority, determining a compensation area corresponding to the concavo-convex portion and adding the compensation area to the layer of the inputted 3D model for slicing; and correct a size of the layer for slicing, based on a result of the examining and a result of the determining the compensation area and the adding, and slice, by the 3D model slicing system, the corrected 3D model.

13. The system of claim 12, wherein, for the correcting, the one or more processors are configured to correct the size of the layer for slicing, based on a width within the layer thickness of the 3D model.

14. The system of claim 12, wherein, for the correcting, the one or more processors are configured to determine a compensation area based on a largest width of widths within the layer thickness of the 3D model in order to preserve the overall dimension of the 3D model.

15. The system of claim 14, wherein, for the correcting, the one or more processors are configured to, when there exists the concavo-convex portion within the layer thickness of the 3D model and it is determined whether to preserve the overall dimension of the 3D model or whether to preserve a minimum width in priority, correct the size of the layer for slicing based on a largest width or a smallest width of widths in each layer thickness according to a result of the determining.

16. The system of claim 15, wherein, for the receiving the input, the one or more processors are configured to receive an input of data of a 3D model to which data setting information for determining whether to preserve the overall dimension of the 3D model or whether to preserve a minimum width in priority is added.

17. The system of claim 12, wherein, for the correcting, the one or more processors are configured to correct the size of the layer for slicing, based on a smallest width of widths in the layer thickness of the 3D model in order to preserve a minimum width of the 3D model in priority.

18. The system of claim 12, wherein the one or more processors are configured to perform 3D printing, by the 3D model slicing system, the 3D model by laminating the sliced 3D model.

19. A 3D model slicing method comprising:
examining, by the 3D model slicing system, a dimension of a layer thickness of an inputted 3D model;
determining whether a concavo-convex portion is detected within a layer of the inputted 3D model;
determining whether to preserve an overall dimension of the 3D model or to preserve a minimum width of the 3D model in priority;
based on the determining that the concavo-convex portion is detected within the layer of the inputted 3D model and based on the determining whether to preserve the overall dimension of the 3D model or to preserve the minimum width of the 3D model in priority, determining a compensation area corresponding to the concavo-convex portion and adding the compensation area to the layer of the inputted 3D model for slicing;
correcting, by the 3D model slicing system, a size of the layer for slicing, based on a result of the examining and a result of the determining the compensation area and the adding; and
slicing, by the 3D model slicing system, the corrected 3D model.

20. A computer-readable non-transitory recording medium having a computer program recorded thereon to execute a 3D model slicing method, the method comprising
examining, by the 3D model slicing system, a dimension of a layer thickness of an inputted 3D model;
determining whether a concavo-convex portion is detected within a layer of the inputted 3D model;
determining whether to preserve an overall dimension of the 3D model or to preserve a minimum width of the 3D model in priority;
based on the determining that the concavo-convex portion is detected within the layer of the inputted 3D model and based on the determining whether to preserve the overall dimension of the 3D model or to preserve the minimum width of the 3D model in priority, determining a compensation area corresponding to the concavo-convex portion and adding the compensation area to the layer of the inputted 3D model for slicing;
correcting, by the 3D model slicing system, a size of the layer for slicing, based on a result of the examining and a result of the determining the compensation area and the adding; and
slicing, by the 3D model slicing system, the corrected 3D model.

* * * * *